United States Patent
Matsui

(10) Patent No.: US 10,963,091 B2
(45) Date of Patent: Mar. 30, 2021

(54) TOUCH PANEL CONTROL APPARATUS, TOUCH PANEL CONTROL METHOD, AND INPUT DISPLAY APPARATUS

(71) Applicant: SHARP KABUSHIKI KAISHA, Sakai (JP)

(72) Inventor: Kuniaki Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/577,388

(22) Filed: Sep. 20, 2019

(65) Prior Publication Data

US 2020/0104003 A1    Apr. 2, 2020

(30) Foreign Application Priority Data

Sep. 27, 2018  (JP) .............................. JP2018-181528

(51) Int. Cl.
   *G06F 3/041*   (2006.01)
   *G06F 3/038*   (2013.01)
   *G06F 3/044*   (2006.01)

(52) U.S. Cl.
   CPC ............ *G06F 3/0416* (2013.01); *G06F 3/038* (2013.01); *G06F 3/044* (2013.01); *G06F 3/0412* (2013.01)

(58) Field of Classification Search
   None
   See application file for complete search history.

(56) References Cited

U.S. PATENT DOCUMENTS

2006/0055680 A1* 3/2006 Okazaki .................. G06F 3/045
                                                       345/173
2017/0351382 A1* 12/2017 Kuo ...................... G06F 3/0418

FOREIGN PATENT DOCUMENTS

JP          09-128146 A      5/1997

* cited by examiner

*Primary Examiner* — Nicholas J Lee
(74) *Attorney, Agent, or Firm* — ScienBiziP, P.C.

(57) ABSTRACT

A touch panel control apparatus includes a delay setting portion which sets a delay amount corresponding to a first gate clock signal for controlling a driving timing of a gate line provided in a liquid crystal panel, a signal generator which adds the delay amount set by the delay setting portion to the first gate clock signal to generate a second gate clock signal, and a touch panel control board which drives a touch panel based on the second gate clock signal generated by the signal generator. The delay setting portion sets a period from a rising timing of the first gate clock signal to immediately before a timing at which noise appearing on the position signal by driving the gate line occurs to the delay amount.

12 Claims, 13 Drawing Sheets

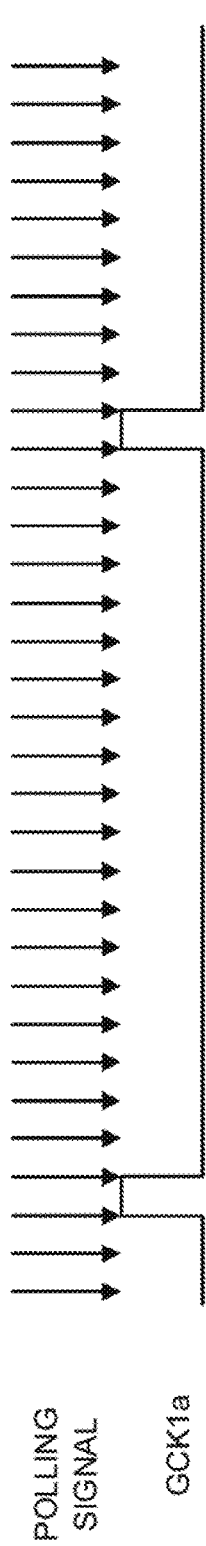
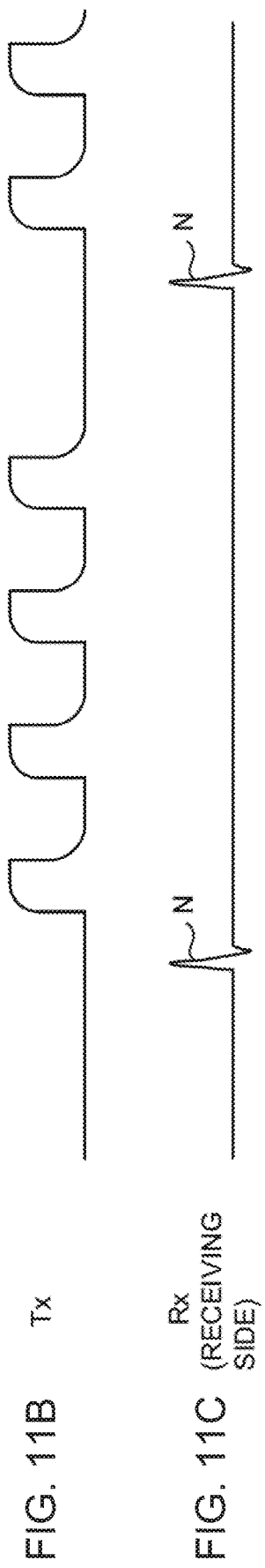
FIG. 11A POLLING SIGNAL / GCK1a
FIG. 11B Tx
FIG. 11C Rx (RECEIVING SIDE)

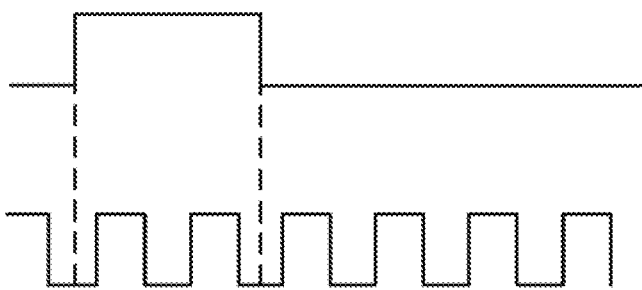

TOUCH PANEL CONTROL APPARATUS, TOUCH PANEL CONTROL METHOD, AND INPUT DISPLAY APPARATUS

INCORPORATION BY REFERENCE

This application is based upon and claims the benefit of priority from the corresponding Japanese Patent Application No. 2018-181528 filed on Sep. 27, 2018, the entire contents of which are incorporated herein by reference.

BACKGROUND OF THE INVENTION

Field of the Invention

The present disclosure relates to a touch panel control apparatus, a touch panel control method, and an input display apparatus, and more particularly to a touch panel control apparatus, a touch panel control method, and an input display apparatus including the touch panel control apparatus to control a touch panel which is provided so as to overlap a screen of a display apparatus and which outputs a position signal corresponding to a touched position by a user.

Description of the Background Art

A touch panel is one of pointing devices used in combination with a display apparatus. The display apparatus (input display apparatus) having the touch panel is called a touch panel display, and is used in various types of electronic devices such as a mobile device, and various apparatuses such as home appliances.

As the touch panel display, there is known a combination of a touch panel of a capacitive type and a liquid crystal display apparatus of an active matrix driving type. In this combination, the touch panel is provided so as to overlap with the screen of the liquid crystal display apparatus, and when the touch panel is touched by a user, the touch panel outputs a position signal corresponding to the touch position touched by the user. Here, noise may appear in the position signal of the touch panel because a gate of the liquid crystal display apparatus (a gate of thin film transistor (TFT) as a switching element (active element) arranged in each pixel) is driven. In this case, the gate drive noise is more likely to appear as the sensor surface of the touch panel is larger, that is, as the screen of the liquid crystal display apparatus is larger. When the gate drive noise appears, for example, even when the touch panel is not touched by a user, it is erroneously recognized that the touch panel is touched by the user. Therefore, the touch panel may malfunction.

In order to avoid the influence of the gate drive noise, there has been known a technique of providing a timing detection circuit for detecting the coincidence between an output change timing of a liquid crystal drive signal from a liquid crystal driver driving the liquid crystal display screen and a predetermined timing for capturing an output data from the touch panel. When the coincidence is not detected by the timing detection circuit, the output data is captured from the touch panel at a predetermined timing. On the other hand, when the coincidence is detected by the timing detection circuit, the output data is captured from the touch panel at a timing different from the predetermined timing. This prevents the output data from being captured from the touch panel at the timing of changing the output of the liquid crystal drive signal from the liquid crystal driver, that is, at the timing of driving the gate line of the liquid crystal display apparatus. As a result, the influence caused by the gate drive noise can be avoided.

Here, in fact, the gate drive noise appears in the position signal of the touch panel at a timing delayed by a predetermined time from the timing of driving the gate line of the liquid crystal display apparatus. Therefore, in the conventional technique, it is difficult to reliably avoid the influence of the gate drive noise. Also, when the output data is not captured from the touch panel during a period from the timing of driving the gate line to the timing when the gate drive noise appears in the position signal of the touch panel, the number of scans on the touch panel is reduced, and the position detection accuracy is lowered.

Further, the gate drive noise appears more remarkably as the distance between the touch panel and the screen of the liquid crystal display apparatus is smaller, in particular, in the case of a structure in which the touch panel is provided on the screen of the liquid crystal display apparatus by known direct bonding. Therefore, in the structure in which the direct bonding is adopted, it is required to avoid the influence of the gate drive noise more reliably.

It is an object of the present disclosure to provide a touch panel control apparatus, a touch panel control method, and an input display apparatus which can reliably avoid the influence of gate drive noise and can prevent a deterioration in position detection accuracy.

SUMMARY OF THE INVENTION

A touch panel control apparatus for controlling a touch panel which is provided to overlap with a display panel and outputs a position signal corresponding to a touch position by a user, the touch panel control apparatus according to an aspect of the present disclosure includes a delay setting portion which sets a delay amount corresponding to a first gate clock signal for controlling a driving timing of a gate line provided in the display panel, a signal generator which adds the delay amount set by the delay setting portion to the first gate clock signal to generate a second gate clock signal, and a touch panel driver which drives the touch panel based on the second gate clock signal generated by the signal generator, the delay setting portion sets a period from a rising timing of the first gate clock signal to immediately before a timing at which noise appearing on the position signal by driving the gate line occurs to the delay amount.

A method of controlling a touch panel which is provided to overlap a display panel and which outputs a position signal corresponding to a touched position by a user according to another aspect of the present disclosure includes setting a delay amount corresponding to a first gate clock signal for controlling a driving timing of a gate line provided in the display panel, adding the delay amount set to the first gate clock signal to generate a second gate clock signal, and driving the touch panel based on the second gate clock signal, in the setting the delay amount, a period from a rising timing of the first gate clock signal to before a timing at which noise appearing on the position signal occurs by driving the gate line is set as the delay amount.

An input display apparatus according to another aspect of the present disclosure includes a display apparatus which displays an image on a display panel, a touch panel which is provided to overlap with the display apparatus and outputs a position signal corresponding to a touch position by a user, and a touch panel control apparatus.

According to the present disclosure, it is possible to reliably avoid the influence of gate drive noise and to prevent the deterioration in position detection accuracy.

This Summary is provided to introduce a selection of concepts a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 11A to 11C are waveform diagrams schematically illustrating examples of polling processing of the gate clock signal in the second embodiment of the present disclosure.

FIGS. 12A and 12B are waveform diagrams schematically illustrating examples of a vertical synchronization signal and the gate clock signal in the second embodiment of the present disclosure.

DESCRIPTION OF THE PREFERRED EMBODIMENTS

Hereinafter, embodiments of the present disclosure will be described with reference to the accompanying drawings. The following embodiments are an example of embodying the present disclosure, and are not intended to limit the scope of the present disclosure.

First Embodiment

The present disclosure is applied to, for example, a touch panel display. Before describing the touch panel display to which the present disclosure is applied, a touch panel display according to a reference embodiment will be described.

Figure 1:
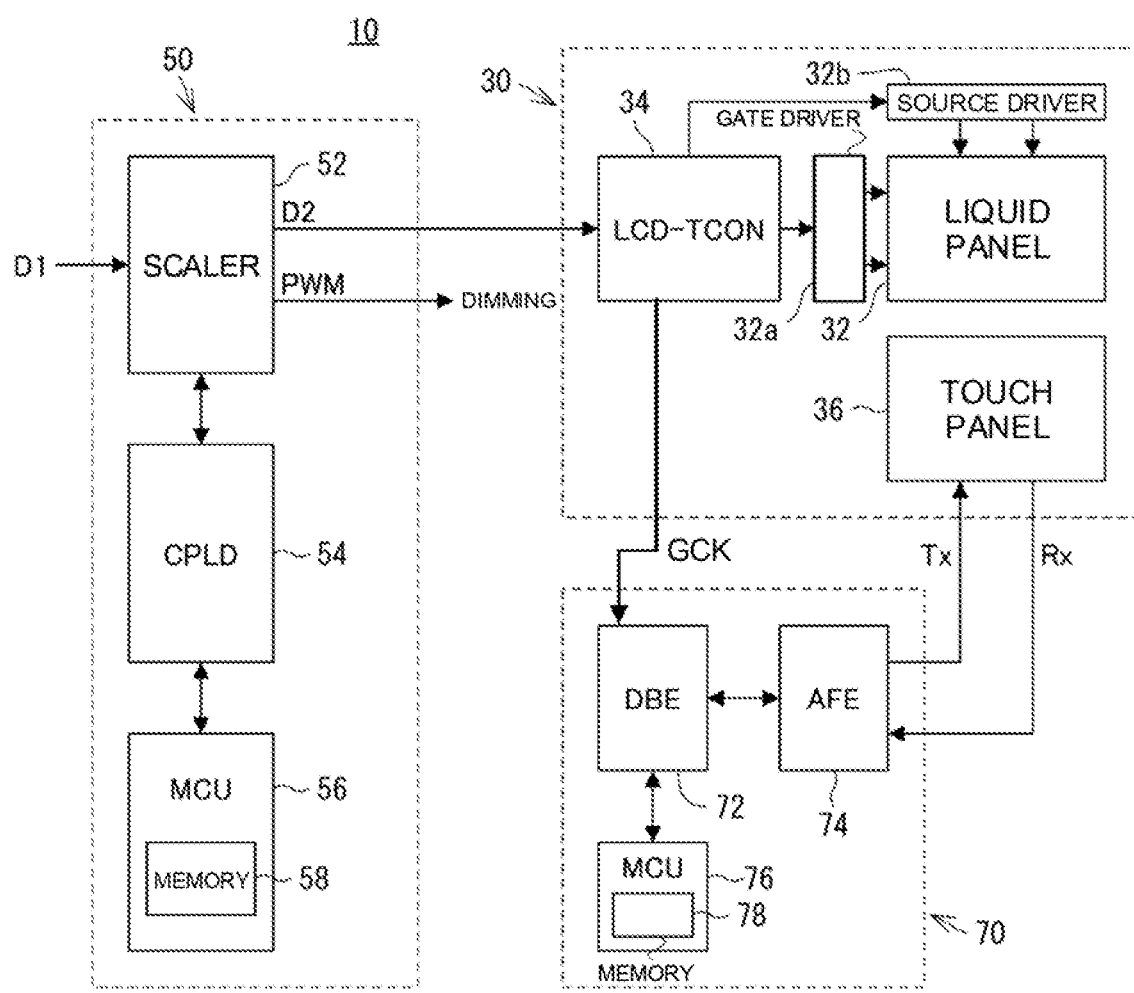
FIG. 1 is a block diagram illustrating a schematic configuration of an electrical part of a touch panel display according to a reference embodiment.

FIG. 1 is a block diagram illustrating a schematic configuration of an electrical part of a touch panel display 10 according to the reference embodiment. As illustrated in FIG. 1, the touch panel display 10 includes a liquid crystal module 30, a main interface board 50, and a touch panel control board 70.

The liquid crystal module 30 includes a liquid crystal panel 32 of an active matrix driving type, a gate driver 32a, a source driver 32b, and a liquid crystal timing controller (LCD-TCON), and a touch panel 36.

Although not illustrated in detail, the liquid crystal panel 32 includes a polarizing filter, a glass substrate, a liquid crystal layer, a backlight, and the like, and forms a screen (image display portion) for displaying information such as a video image, which will be described later. The number of pixels in the horizontal direction×the vertical direction of the screen is, for example, 1920×1080 or 3840×2160. On the glass substrate are formed wirings including gate lines (scan lines) and source lines (data lines), thin film transistors (TFTs), electrodes including pixel electrodes and common electrodes, and the like.

The gate driver 32a receives gate line control signals such as a gate clock signal GCK and a gate start pulse signal GSP for controlling the driving timings of the gate lines from the liquid crystal timing controller 34 as will be described later. The gate driver 32a controls the thin film transistors in accordance with the gate line control signals so that the thin film transistors of the liquid crystal panel 32 are turned on in the order of the gate lines.

The source driver 32b receives a source line control signal and an image data signal DT from the liquid crystal tinning controller 34 as will be described later. The source driver 32b inputs the image data signal DT to each source line in accordance with the source line control signal. Accordingly, a voltage corresponding to the image data signal DT is applied to a pixel (liquid crystal) corresponding to the thin film transistor turned on, to write date.

The liquid crystal timing controller 34 controls the gate driver 32a and the source driver 32b to display a video image corresponding to a video signal D2 on the screen of the liquid crystal panel 32 based on the video signal D2. Specifically, the liquid crystal timing controller 34 inputs the gate line control signals such as the gate clock signal GCK and the gate start pulse signal GSP, to the gate driver 32a. Further, the liquid crystal tinning controller 34 inputs the source line control signal and the image data signal DT to the source driver 32b.

The touch panel 36 is a mutual capacitance type among projected capacitance types. Although not illustrated in detail, the touch panel 36 includes an electrostatic capacitance sensor sheet and is provided by direct bonding so as to overlap with the screen of the liquid crystal panel 32. The touch panel 36 includes a driving electrode and a receiving electrode. The driving electrode receives a drive signal Tx for driving the touch panel 36. When the touch panel 36 is touched by the user while receiving the drive signal Tx, the touch panel 36 outputs a position signal Rx corresponding to the touch position to the touch panel 36 by the user from the receiving electrode. The position signal Rx is a current signal.

The main interface board 50 includes a scaler (video signal conversion apparatus) 52, a complex programmable logic device (CPLD) 54, and a micro control unit (MCU) 56. The scaler 52 can receive a video signal D1 according to various standards such as display ports and a high-definition multimedia interface (HDMI). The scaler 52 converts the input video signal D1 into the video signal D2 conforming to the signal input condition of the liquid crystal module 30, and inputs the video signal D2 to the liquid crystal timing controller 34 in the liquid crystal module 30. The video signal D2 includes a horizontal synchronization signal HS, a vertical synchronization signal VS, a dot clock signal. DCK, the image data signal DT, and the like. The scaler 52 has a function of outputting, for example, a pulse width modulation (PWM) signal. The PWM signal is used as a dimming signal for adjusting the brightness of a backlight, which is not illustrated, in the liquid crystal panel 32. As the PWM signal, a signal synchronized with the horizontal synchronization signal HS included in the video signal. D2 is output. In other words, the scaler 52 has a function of generating the PWM signal synchronized with the horizontal synchronization signal HS. More specifically, the scaler 52 has a function of generating not only the PWM signal but also other pulse signals that are synchronized with the horizontal synchronization signal HS. The scaler 52 is implemented by an Application Specific integrated Circuit (ASIC), for example.

The CPLD 54 is connected to the scaler 52. The CPLD 54 has a function of increasing the number of input and output ports of the main interface board 50 including input and output ports of the scaler 52, for example. The CPLD 54 also functions as a bus selector for dividing bus lines in the main interface board 50 into a group of bus lines and switching the group of bus lines. Further, the CPLD 54 has also a function of generating various pulse signals to be used as reference signals in peripheral circuits. As described above, the CPLD 54 performs a general-purpose function.

The MCU 56 is responsible for controlling appropriate elements mounted on the main interface hoard 50 including the CPLD 54. That is, the above-described functions carried out by the CPLD 54 are implemented by the control of the MCU 56. The MCU 56 has a memory 58. The memory 58 stores a control program to be described later for controlling the operation of the MCU 56.

The touch panel control board 70 includes a digital back end (DBE) 72, an analog front end (AFE) 74, and an MCU 76.

The DBE 72 cooperates with the AFE 74 to generate the drive signal Tx and input the drive signal Tx to the touch panel 36. The DBE 72, in cooperation with the AFE 74, receives the position signal Rx from the touch panel 36, and generates a position signal indicative of a touch position to the touch panel 36 by a user based on the position signal Rx and the drive signal. Tx. The position data signal is input to a main MCU (not illustrated) in the touch panel display 10 and is subjected to appropriate processing by the main MCU.

The MCU 76 in the touch panel control board 70 is responsible for controlling appropriate elements mounted on the touch panel control board 70 including the DBE 72. For example, the period (cycle) of the drive signal Tx having the pulse shape, the number of times to scan the drive signal Tx, the switching period of the drive signal Tx and the position signal Rx (i.e., the switching period of the driving electrode and the receiving electrode), and the like are determined by the operation of the DBE 72, and the operation of the DBE 72 is controlled by the MCU 76. The MCU 76 has a memory 78. The memory 78 stores a touch panel control program for controlling the operation of the MCU 76.

In the touch panel display 10, when the video signal D1 is input to the scaler 52, the scaler 52 converts the input video signal D1 into the video signal D2 and inputs the video signal D2 to the liquid crystal timing controller 34. The liquid crystal timing controller 34 controls the gate driver 32a and the source driver 32h so that the liquid crystal panel 32 is driven by the active matrix driving method based on the video signal D2. For this purpose, as described above, the gate line control signals such as the gate clock signal GCK and the gate start pulse signal GSP are input to the gate driver 32a from the liquid crystal timing controller 34. In addition, the source line control signal and the image data signal DT are input to the source driver 32b from the liquid crystal timing controller 34. Responsive to these, the gate driver 32a appropriately controls the thin film transistors in the liquid crystal panel 32, and the source driver 32b appropriately writes data to each pixel. As a result, a video image according to the video signal D2 is displayed on the screen of the liquid crystal panel 32.

In parallel with this, the drive signal Tx is input to the touch panel 36 from the touch panel control board 70. In this state, when the touch panel 36 is touched by a user, the touch panel 36 outputs the position signal Rx corresponding to the touch position to the touch panel 36 by the user. The position signal Rx is input to the touch panel control board 70, and is subjected to processing for generating the position signal described above together with the drive signal Tx. In this manner, the main interface board 50 and the touch panel control board 70 are provided so as to overlap the liquid crystal panel 32 and control the touch panel 36, which outputs the position signal corresponding to the touch position of the user.

Incidentally, in the touch panel display 10, gate drive noise N caused by driving the gate line (the gate of the thin film transistor) in the liquid crystal panel 32 may appear on the receiving side of the AFE 74 which is the input destination of the position signal Rx. The gate drive noise N is more likely to appear as the sensor surface of the touch panel 36 is larger, that is, as the screen of the liquid crystal panel 32 is larger. Further, the gate drive noise N appears more remarkably as the distance between the touch panel 36 and the screen of the liquid crystal panel 32 is smaller, in particular, in the case of a structure in which the touch panel 36 is provided on the screen of the liquid crystal panel 32 by the above-described direct bonding. When the gate drive noise N appears, for example, even when the touch panel 36 is not touched by the user, the touch panel 36 may be erroneously recognized as being touched by the user. That is, the touch panel 36 (strictly, a touch panel system including the touch panel 36 and the touch panel control board 70) may malfunction. Therefore, it is important to avoid the influence of the gate drive noise N.

Figure 2:
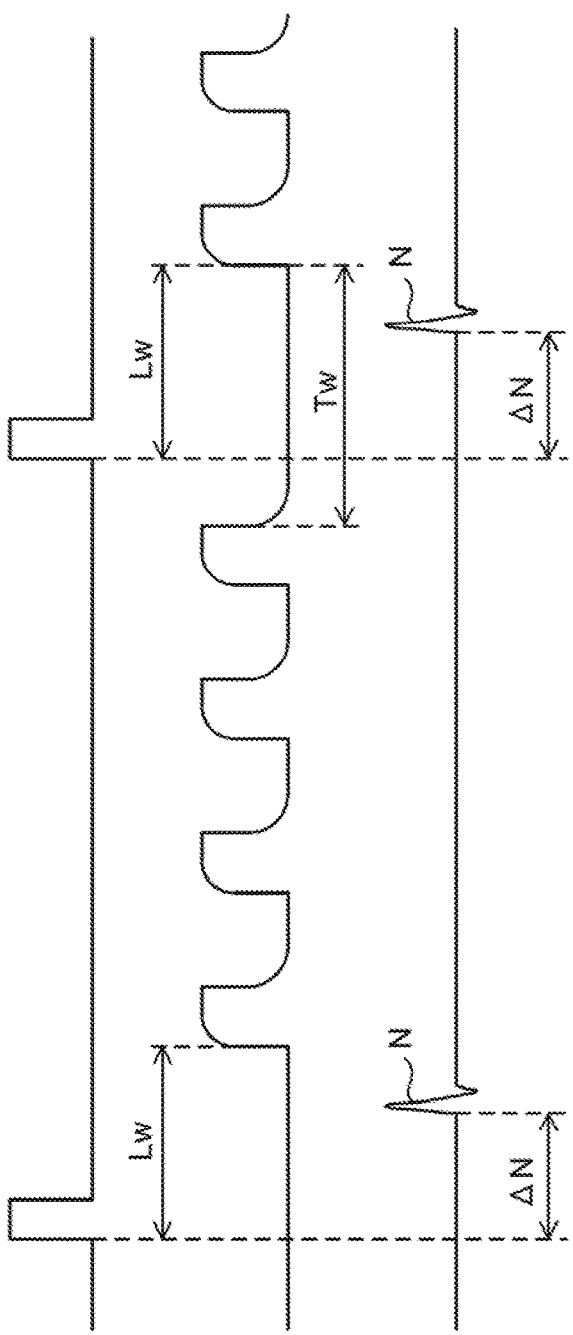
FIGS. 2A to 2C are waveform diagrams schematically illustrating examples of a gate clock signal, a touch panel drive signal, and a gate drive noise in the touch panel display according to the reference embodiment.

The gate drive noise N occurs at a timing synchronized with the period of the gate clock signal GCK for driving the gate line in the liquid crystal panel 32, and strictly occurs at a timing with a constant delay time $\Delta N$ with respect to the gate clock signal GCK. This state is illustrated in FIGS. 2A to 2C. FIG. 2A illustrates the gate clock signal GCK, and FIG. 2B illustrates the drive signal. Tx of the touch panel 36. FIG. 2C illustrates a waveform on the receiving side of the AFE 74 that is the input destination of the position signal Rx, when the touch panel 36 is not touched by the user. As illustrated in FIG. 2C, even when the touch panel 36 is not touched by the user, the gate drive noise N occurs on the receiving side of the AFE 74 that is the input destination of the position signal Rx of the touch panel 36. The delay time $\Delta N$ of the gate drive noise N with respect to the gate clock signal GCK is caused by the responsiveness of the liquid crystal panel 32 and the responsiveness of the touch panel 36, and the like, and constant as described above.

It seems that the influence of the gate drive noise N can be avoided by estimating the timing at which the gate drive noise N occurs, for example, based on the gate clock signal GCK, from the relationship between the gate drive noise N and the gate clock signal GCK. For example, in the configuration in which the gate clock signal GCK is input from the liquid crystal timing controller 34 to the DBE 72 as illustrated in FIG. 1, the DBE72 works with ΔFE74 to generate the drive signal Tx taking into account the delay time ΔN, and inputs the drive signal Tx to the touch panel 36, based on the gate clock signal GCK. This makes it possible to avoid the influence of the gate drive noise N.

However, when the DBE 72 is configured to generate the drive signal Tx based on the gate clock signal GCK acquired from the liquid crystal timing controller 34 and the delay time ΔN, the input of the drive signal Tx to the touch panel 36 is stopped, and more specifically, the generation of the pulse of the drive signal Tx is stopped, over a predetermined standby period Lw from the rising timing of the gate clock signal GCK. That is, the operation of the touch panel 36 is invalidated over the standby period Lw. Therefore, as illustrated in FIGS. 2A to 2C, scan processing (position detection processing) is not performed in an invalid period Tw in one frame period, and the number of scans of the touch panel 36 in the one frame period is reduced (four times in FIGS. 2A to 2C). As a result, there arises a problem that the position detection accuracy is lowered.

In order to solve the problem, a touch panel display 10a according to the first embodiment has the following configuration.

Figure 3:
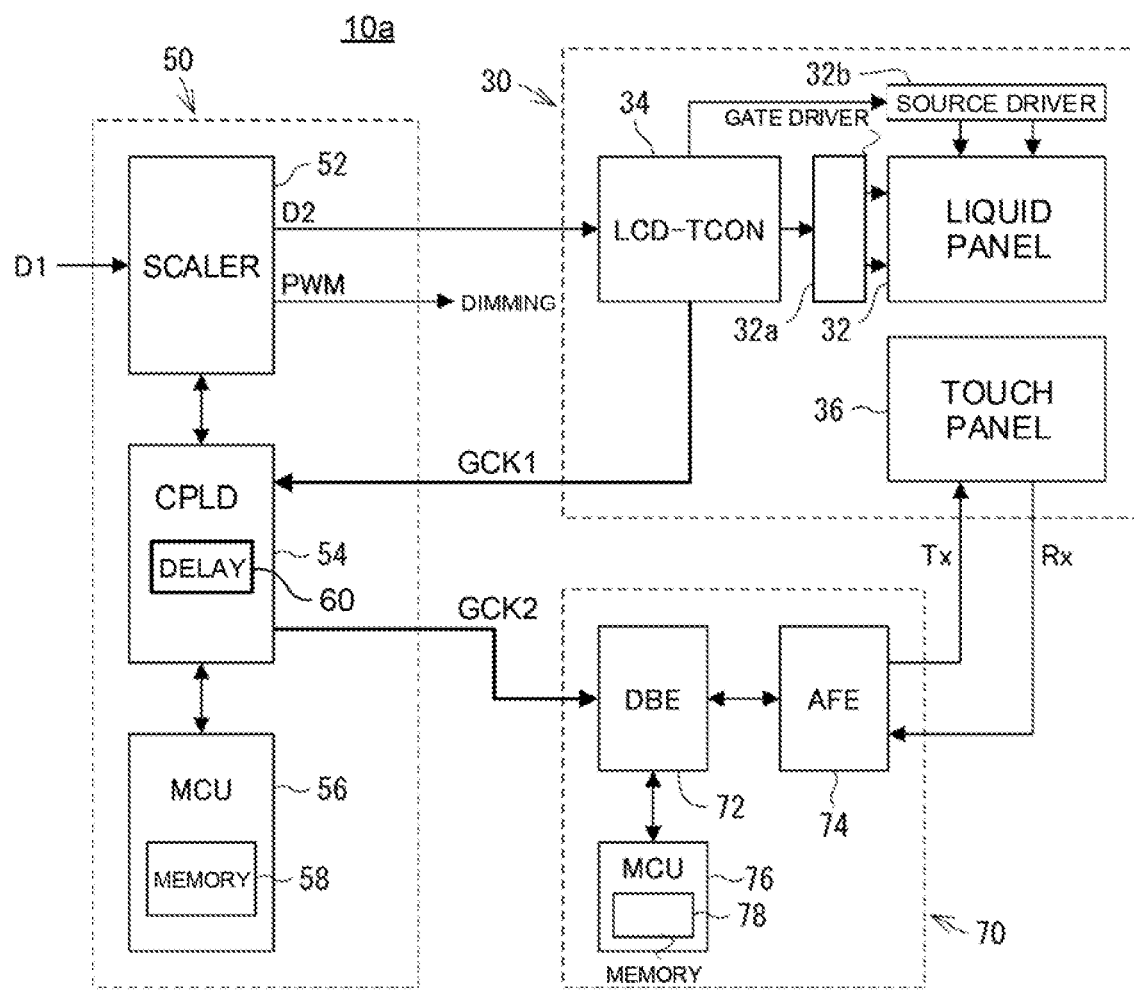
FIG. 3 is a block diagram illustrating a schematic configuration of an electrical part of a touch panel display according to a first embodiment of the present disclosure.

Specifically, as illustrated in FIG. 3, in the touch panel display 10a according to the first embodiment, the gate clock signal GCK generated by the liquid crystal timing controller 34 is input from the liquid crystal timing controller 34 to the gate driver 32a, and input to the CPLD 54 in the main interface board 50. Moreover, in the touch panel display 10a according to the first embodiment, a delay circuit 60 is provided by the CPLD 54. The CPLD 54 has a sufficient number of logic circuits to be able to provide the delay circuit 60 in addition to the above-described general-purpose function. Note that the other configurations of the touch panel display 10a according to the first embodiment are the same as those of the touch panel display 10 according to the reference embodiment illustrated in FIG. 1. Accordingly, the same parts as those in FIG. 1 are denoted by the same reference numerals, and description thereof is also omitted.

As illustrated in FIG. 3, the liquid crystal timing controller 34 outputs a gate clock signal GCK 1. The gate clock signal GCK 1 is input to the delay circuit 60 in the CPLD 54. The delay circuit 60 adds a predetermined delay amount Ld to the gate clock signal GCK 1 input to the delay circuit 60.

The delay amount Ld is set in advance by the MCU 56. Specifically; the MCU 56 measures in advance a period (delay time ΔN) from the rising timing of the gate clock signal GCK1 to the timing at which the gate drive noise N occurs. For example, in an inspection step after the completion of the touch panel display 10a, the gate clock signal GCK is input to the gate driver 32a to generate the gate drive noise N on the touch panel display 10a, thereby measuring the period. The MCU 56 sets the delay amount Ld based on the period measured. For example, the MCU 56 sets as the delay amount Ld, a period from the rising timing of the gate clock signal GCK 1 to immediately before the timing at which the gate drive noise N occurs. Thus, the delay amount Ld is individually set for each touch panel display 10a.

The memory 58 in the MCU 56 stores the aforementioned control program. The control program includes a delay amount setting program. The delay amount setting program is a program for setting an appropriate delay amount Ld in the delay circuit 60 as described above.

The CPLD 54 adds the delay amount Ld set by the MCU 56 to the gate clock signal GCK 1 to generate the gate clock signal GCK 2. The gate clock signal GCK 2 generated by the CPLD 54 is input to the DBE 72 in the touch panel control board 70.

The DBE 72 drives the touch panel 36 based on the gate clock signal GCK 2 generated by the CPLD 54. Specifically, the DBE 72 cooperates with the ΔFE 74 to generate the drive signal Tx described above. At this time, the input of the drive signal Tx to the touch panel 36 is stopped for the predetermined standby period Lw with the gate clock signal GCK 2 as a reference. As a result, the touch panel 36 becomes in a standby state over the standby period Lw. In other words, the operation of the touch panel 36 is disabled over the standby period Lw.

When the timing at which the gate drive noise N occurs, specifically, the period in which the gate drive noise N occurs falls within the standby period Lw, the influence of the gate drive noise N is avoided. This state is illustrated in FIGS. 4A to 4D, for example.

Figure 4:
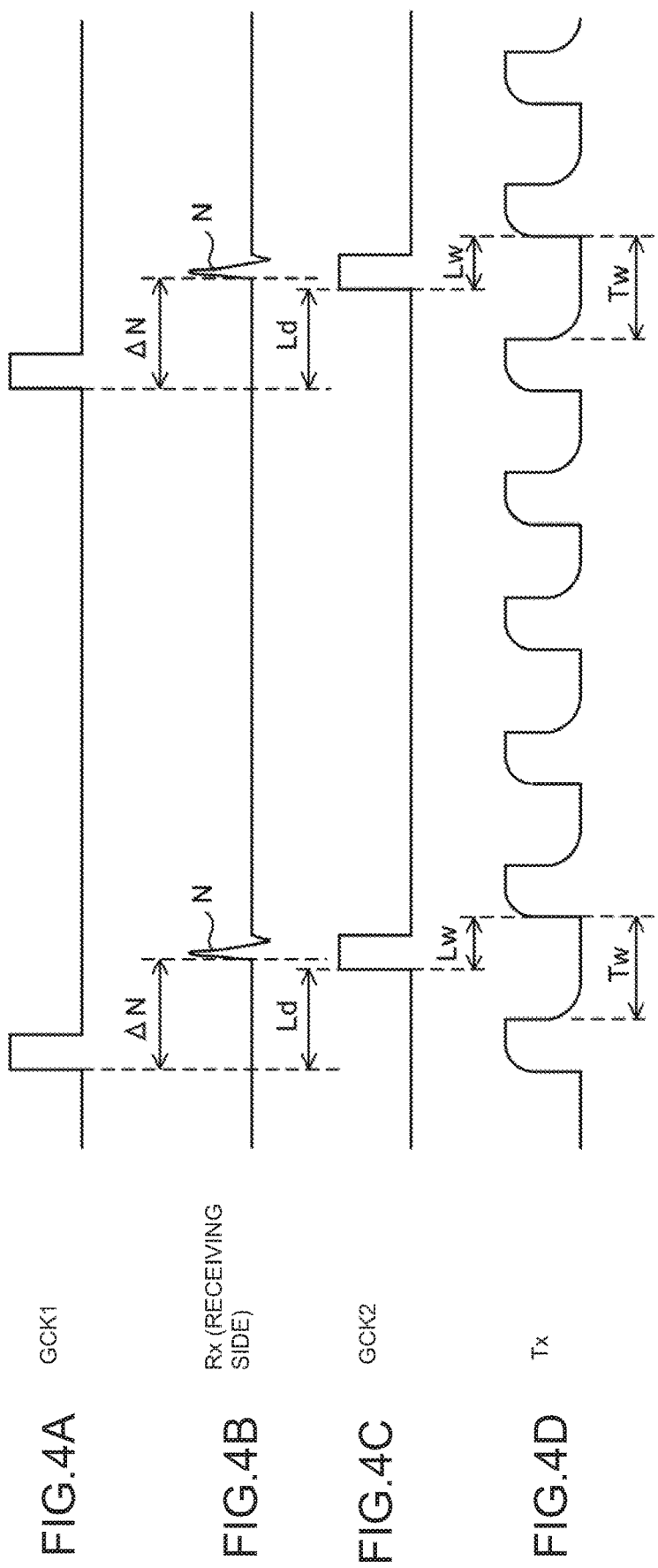
FIGS. 4A to 4D are waveform diagrams schematically illustrating examples of main signals in the first embodiment of the present disclosure.

That is, it is assumed that the delay time ΔN is present between the gate clock signal GCK 1 illustrated in FIG. 4A and the gate drive noise N illustrated in FIG. 4B. Then, the gate clock signal GCK 2 illustrated in FIG. 4C is generated by adding the delay amount Ld by the delay circuit 60 to the gate clock signal GCK 1. Further, using the gate clock signal GCK 2 as a reference, for example, using the rising timing of the gate clock signal GCK 2 as a reference (base point), the input of the drive signal Tx illustrated in FIG. 4D to the touch panel 36 is stopped, specifically, the generation of the pulse of the drive signal Tx is stopped, over the predetermined standby period Lw. On the other hand, the gate drive noise N occurs on the receiving side of the ΔFE 74 that is the input destination of the position signal. Rx of the touch panel 36 illustrated in FIG. 4B. Here, when the timing at which the gate drive noise N occurs, specifically, the period in which the gate drive noise N occurs falls within the standby period Lw, the influence of the gate drive noise N is avoided.

The timing at which the standby period Lw is provided, for example, the start timing of the standby period Lw is determined by the delay amount Ld in the delay circuit 60. Therefore, the delay amount Ld in the delay circuit 60 is set in advance so that the occurrence period of the gate drive noise N falls within the standby period Lw. Thus, the touch panel display 10a does not drive the touch panel 36 during a period from the rising timing of the gate clock signal GCK 2 to the timing at which the occurrence period of the gate drive noise N is ended. Therefore, the influence of the gate drive noise N is avoided.

The touch panel display 10a drives the touch panel 36 based on the gate clock signal GCK 2 obtained by delaying the gate clock signal GCK generated by the liquid crystal timing controller 34 according to the occurrence timing of the gate drive noise N. Specifically, the CPLD 54 generates the gate clock signal GCK 2 so as to overlap with the occurrence timing of the gate drive noise N, and the DBE 72 generates the drive signal Tx based on the gate clock signal GCK 2 and inputs the drive signal Tx to the touch panel 36. Thereby, compared with the reference embodiment (see FIGS. 2A to 2C), the standby period Lw can be shortened (see FIGS. 4A to 4D). Since the standby period Lw can be shortened, the invalid period IV can also be shortened as well. Accordingly, since the number of scans of the touch panel 36 in one frame period can be increased (five times in FIGS. 4A to 4D), the position detection accuracy can be improved.

Note that the touch panel display 10a is an example of an input display apparatus according to the present disclosure. Further, the main interface board 50 and the touch panel control board 70 are an example of a touch panel control apparatus according to the present disclosure, and the touch panel control board 70 is an example of a touch panel driver according to the present disclosure. Further, the liquid crystal panel 32 is an example of a display panel according to the present disclosure, and the liquid crystal timing controller 34 is an example of a timing controller according to the present disclosure. Further, the MCU 56 is an example of a delay setting portion according to the present disclosure, and the CPLD 54 is an example of a signal generator according to the present disclosure. Further, the gate clock signal GCK 1 is an example of a first gate clock signal according to the present disclosure, and the gate clock signal GCK 2 is an example of a second gate clock signal according to the present disclosure.

In the above-described embodiment, the signal waveform that becomes active when the gate clock signal is at the high level (high active) is illustrated. However, a signal waveform that becomes active when the gate clock signal is at a low level (low active) may be employed. When the gate clock signal is the low active signal, the present embodiment is operated at the falling timing of the gate clock signal.

Figure 5:
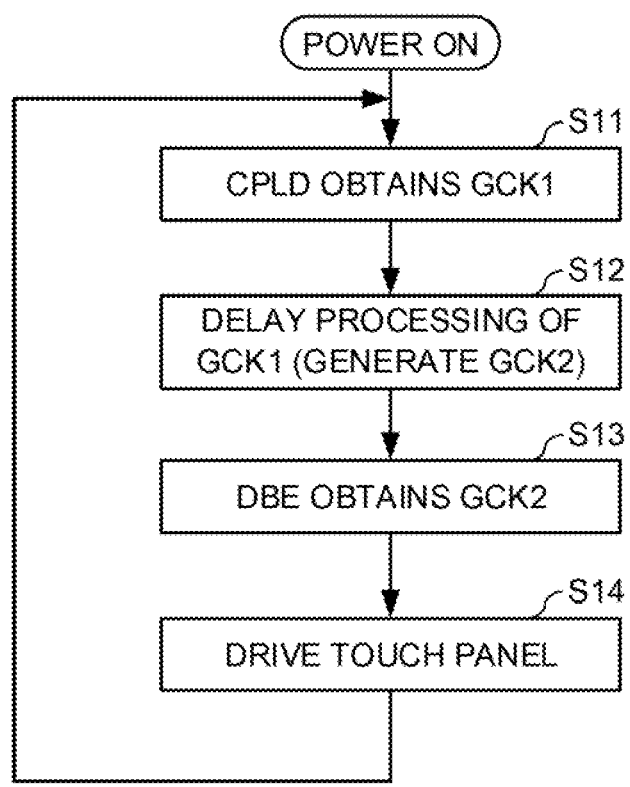
FIG. 5 is a flow diagram illustrating a flow of the overall operation of the touch panel display according to the first embodiment of the present disclosure.

FIG. 5 illustrates the overall processing flow of the touch panel display 10a according to the first embodiment.

As illustrated in FIG. 5, when the power of the touch panel display 10a is turned on and the video signal D1 is input to the scaler 52, the CPLD 54 obtains the gate clock signal GCK 1 from the liquid crystal timing controller 34 in step S11.

When the gate clock signal GCK is input from the liquid crystal timing controller 34 to the CPLD 54, in step S12, the CPLD 54 (the delay circuit 60) adds the delay amount Ld preset by the MCU 56 to the gate clock signal GCK 1, to generate the gate clock signal GCK 2. The MCU 56 executes processing for setting the appropriate delay amount Ld in the delay circuit 60 in accordance with the delay amount setting program described above.

Next, in step S13, the DBE 72 in the touch panel control board 70 obtains the gate clock signal GCK 2 output from the CPLD 54.

Next, in step S14, the touch panel control board 70 starts driving the touch panel 36, that is, starts inputting the drive signal Tx to the touch panel 36, based on the gate clock signal GCK 2. Further, the touch panel control board 70 starts accepting input of the position signal Rx from the touch panel 36 based on the gate clock signal GCK 2. As a result, the whole of the touch panel display 10a including the touch panel 36 is activated. As described above, the touch panel 36 is in the standby state over the standby period. Lw based on the gate clock signal GCK 2, and the operation thereof is disabled. As a result, the malfunction caused by the gate drive noise N is avoided.

Thereafter, the processing returns to step S11, and the above-described processing is repeated. The series of processes is terminated by turning off the power of the touch panel display 10a.

Thus, according to the first embodiment, the appropriate delay amount Ld is set in the delay circuit 60 based on the period of the gate clock signal GCK 1 and the occurrence timing of the gate drive noise N, and the drive signal Tx is input to the touch panel 36 based on the gate clock signal GCK 2 obtained by delaying the gate clock signal GCK 1 by the delay amount Ld. Thereby, the influence by the gate drive noise N is avoided.

Moreover, according the first embodiment, since the standby period Lw and the invalid period Tw (see FIGS. 4A to 4D) can be shortened, the number of scans of the touch panel 36 in one frame period can be increased. Therefore, it is possible to improve the accuracy of the position detection of the touch panel 36.

The touch panel display 10a according to the first embodiment is not limited to the configuration described above. As another embodiment, the touch panel display 10a may be configured to execute a delay process for setting the delay amount Ld when the touch panel display 10a is activated. The operation flow of the touch panel display 10a corresponding to this configuration will be described below.

Figure 6:
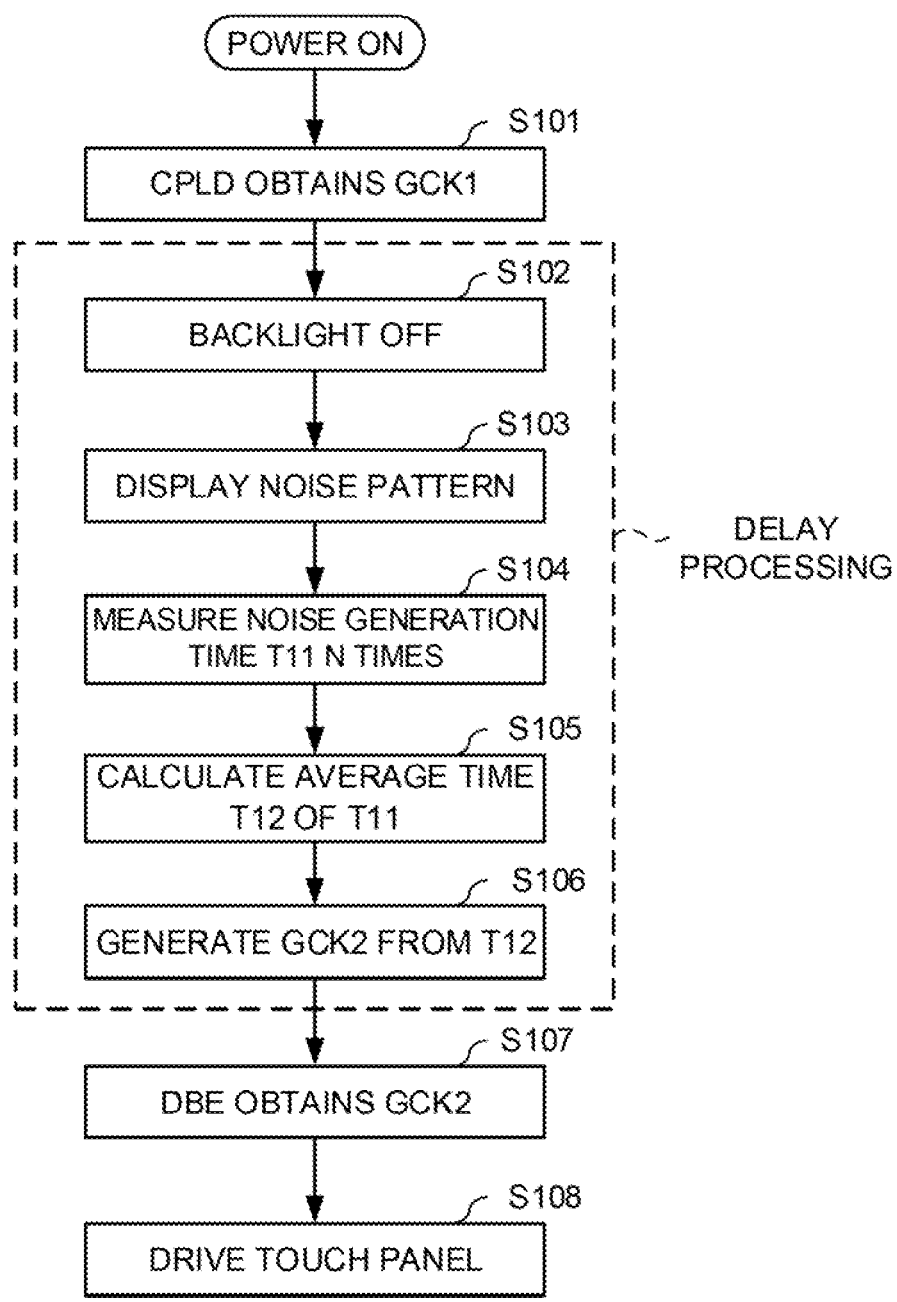
FIG. 6 is a flow diagram illustrating another operation flow of the touch panel display according to the first embodiment of the present disclosure.

As illustrated in FIG. 6, when the power of the touch panel display 10a is turned on and the video signal D1 is input to the scaler 52, in step S101, the CPLD 54 obtains the gate clock signal GCK 1 output from the liquid crystal tinning controller 34.

When the gate clock signal GCK 1 is input from the liquid crystal timing controller 34 to the CPLD 54, in step S102, the scaler 52 turns off the backlight (displays black) by the PWM signal.

Next, in step S103, the scaler 52 inputs the video signal D2 having a noise pattern (for example, a two-dot staggered pattern) to the liquid crystal timing controller 34. As a result, the noise pattern (the pattern image) is displayed on the screen of the liquid crystal panel 32.

Next, in step S104, the MCU 56 monitors the voltage and measures the time in which the gate drive noise N occurs (noise generation time T11) n times. Specifically, the MCU 56 measures, ii times, the period from the output timing of the gate clock signal GCK 1 to the occurrence timing of the gate drive noise N (the noise generation time T11). The number of measurements n is set to 20 times or less. The MCU 56 performs one measurement at 7.5 us (microsecond). The MCU 56 increases the number of measurements to improve the accuracy of the measured values.

Next, in step S105, the MCU 56 calculates an average time T12 of the noise generation time T11 obtained by n measurements.

Next, in step S106, the CPLD 54 generates the gate clock signal GCK 2 based on the average time T12. For example, the CPLD 54 sets the delay time (the delay amount Ld) so that the pulse rises 1 us (one microsecond) before the time when the gate drive noise N occurs (the average time T12), to generate the gate clock signal GCK 2.

Next, in step S107, the DBE 72 in the touch panel control board 70 obtains the gate clock signal GCK 2 from the CPLD 54.

Next, in step S108, the touch panel control board 70 starts driving the touch panel 36, that is, starts inputting the drive signal Tx to the touch panel 36, based on the gate clock signal GCK 2. Further, the touch panel control board 70 starts accepting input of the position signal Rx from the touch panel 36 based on the gate clock signal GCK 2. As a result, the whole of the touch panel display 10a including the touch panel 36 is activated. As described above, the touch panel 36 is in a standby state for the standby period Lw (for example, 3 us (three microsecond)) with the gate clock signal GCK 2 as a reference, and its operation is invalidated. As a result, the malfunction caused by the gate drive noise N is avoided.

The above-described processing is executed every time the power source of the touch panel display 10a is turned on. This makes it possible to dynamically set the delay amount Ld.

Further, the touch panel display 10a may dynamically set the delay amount Ld according to the following configuration.

Figure 7:
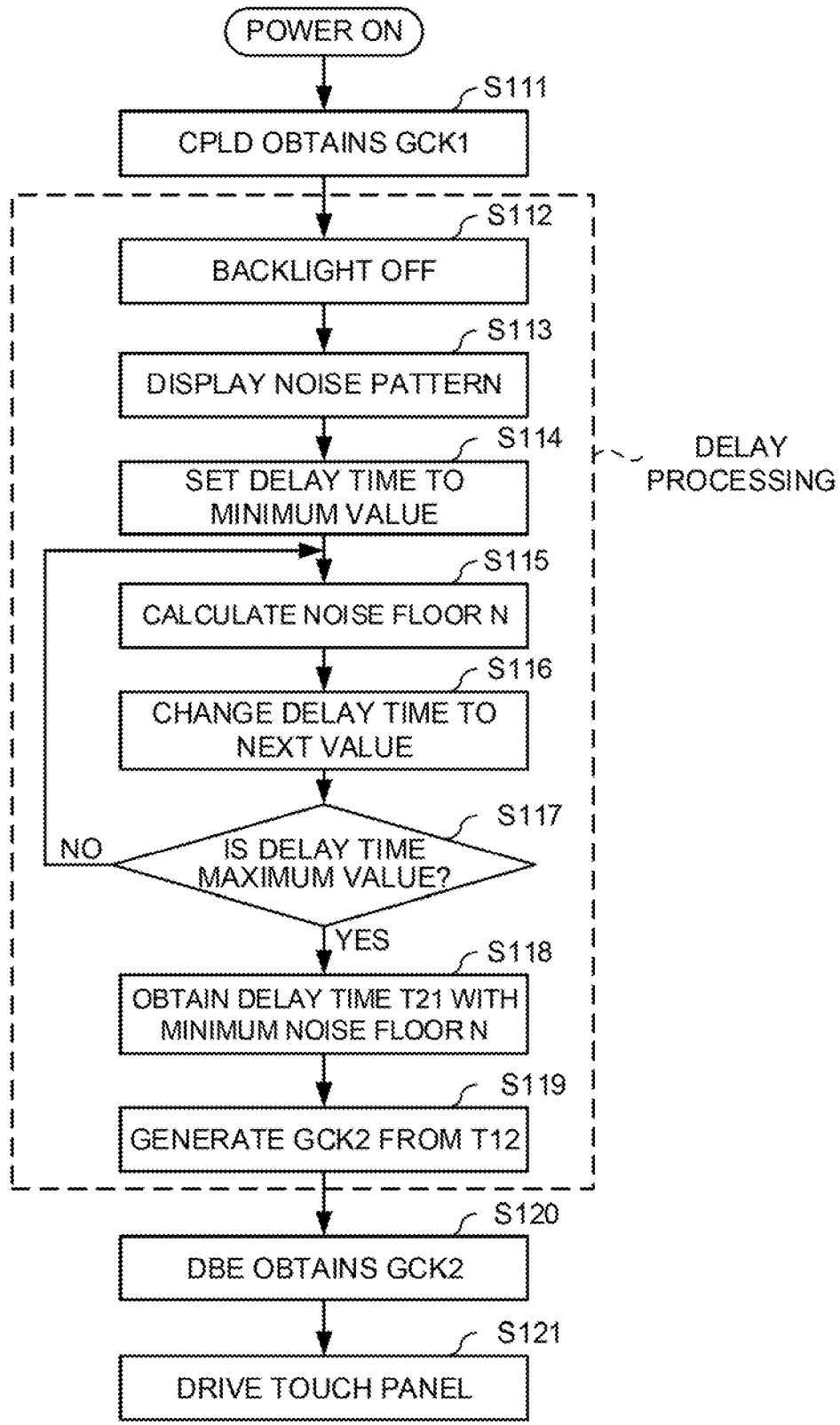
FIG. 7 is a flow diagram illustrating another operation flow of the touch panel display according to the first embodiment of the present disclosure.

As illustrated in FIG. 7, when the power of the touch panel display 10a is turned on and the video signal D1 is input to the scaler 52, in step S111, the CPLD 54 obtains the gate clock signal GCK 1 from the liquid crystal timing controller 34.

When the gate clock signal GCK is input from the liquid crystal timing controller 34 to the CPLD 54, in step S112, the scaler 52 turns off the backlight (displays black) by the PWM signal.

Next, in step S113, the scaler 52 inputs the video signal D2 having a noise pattern (for example, a two-dot staggered pattern) to the liquid crystal timing controller 34. Thereby, the noise pattern is displayed on the screen of the liquid crystal panel 32.

Next, in step S114, the MCU 56 sets the delay time to the minimum n value.

Next, in step S115, the MCU 56 calculates a noise floor N. For example, if the detected value is d (x, y), then the noise floor N is calculated by the following equation. In the following expression, $\Sigma$ represents the total sum of the X axis (0 to X) and the Y axis (0 to Y).

$$N(i)=(\Sigma\Sigma|d(x,y)|)/(S\times Y)$$

Next, in step S116, the MCU 56 changes the delay time to the next value. Steps S115 to S117 are repeated until the delay time reaches the maximum value. The MCU 56 obtains each noise floor N calculated by changing the delay time up to the maximum value, and stores each noise floor N in the N (i) array.

When the delay time reaches the maximum value (S117: YES), in step S118, the MCU 56 obtains a delay time T21 at which the noise floor N is the minimum value.

In step S119, the CPLD 54 generates the gate clock signal GCK 2 based on the delay time T21. For example, the CPLD 54 adds the delay time T21 (the delay amount Ld) to the gate clock signal GCK 1 to generate the gate clock signal GCK 2.

Next, in step S120, the DBE 72 in the touch panel control board 70 obtains the gate clock signal GCK 2 from the CPLD 54.

Next, in step S121, the touch panel control board 70 starts driving the touch panel 36, that is, starts inputting the drive signal Tx to the touch panel 36, based on the gate clock signal GCK 2. Further, the touch panel control board 70 starts accepting input of the position signal Rx from the touch panel 36 based on the gate clock signal GCK 2. As a result, the whole of the touch panel display 10a including the touch panel 36 is activated. As described above, the touch panel 36 is in a standby state for the standby period Lw (for example, 3 us (three microsecond)) with the gate clock signal GCK 2 as a reference, and its operation is invalidated. As a result, the malfunction caused by the gate drive noise N is avoided.

The above-described processing is executed every time the power source of the touch panel display 10a is turned on. This makes it possible to dynamically set the delay amount Ld.

Second Embodiment

According to the reference embodiment illustrated in FIG. 1, the touch panel display further causes the following problem. Specifically, in the touch panel display 10, the liquid crystal tinning controller 34 outputs the gate clock signal. GCK to the gate driver 32a and the DBE 72 during a period during which the image corresponding to the input video signal D1 is displayed on the screen of the liquid crystal panel 32 (display period). On the other hand, the liquid crystal timing controller 34 does not output the gate clock signal OCR to the gate driver 32a and the DBE 72 during a period in which the video signal D1 is not input, that is, during a period in which no image is displayed on the screen of the liquid crystal panel 32 (non-display period).

Therefore, in the non-display period, the DBE 72 cannot acquire the gate clock signal GCK, so that the drive signal Tx cannot be generated, and the input of the drive signal Tx to the touch panel 36 is stopped. In other words, in the non-display period, the operation of the touch panel 36 is disabled, so that the standby state (sleep mode) is established.

When an external device (a mouse, a keyboard, or the like) is connected to an external interface of the touch panel display, it is possible to return from the standby state to the normal state based on an input signal by the external device. On the other hand, when the external device is not connected, there arises a problem that it is impossible to return to the normal state until the video signal is input.

Therefore, the touch panel display 10b according to a second embodiment of the present disclosure has a configuration for solving the above problem in addition to the configuration of the touch panel display 10a according to the first embodiment.

Figure 8:
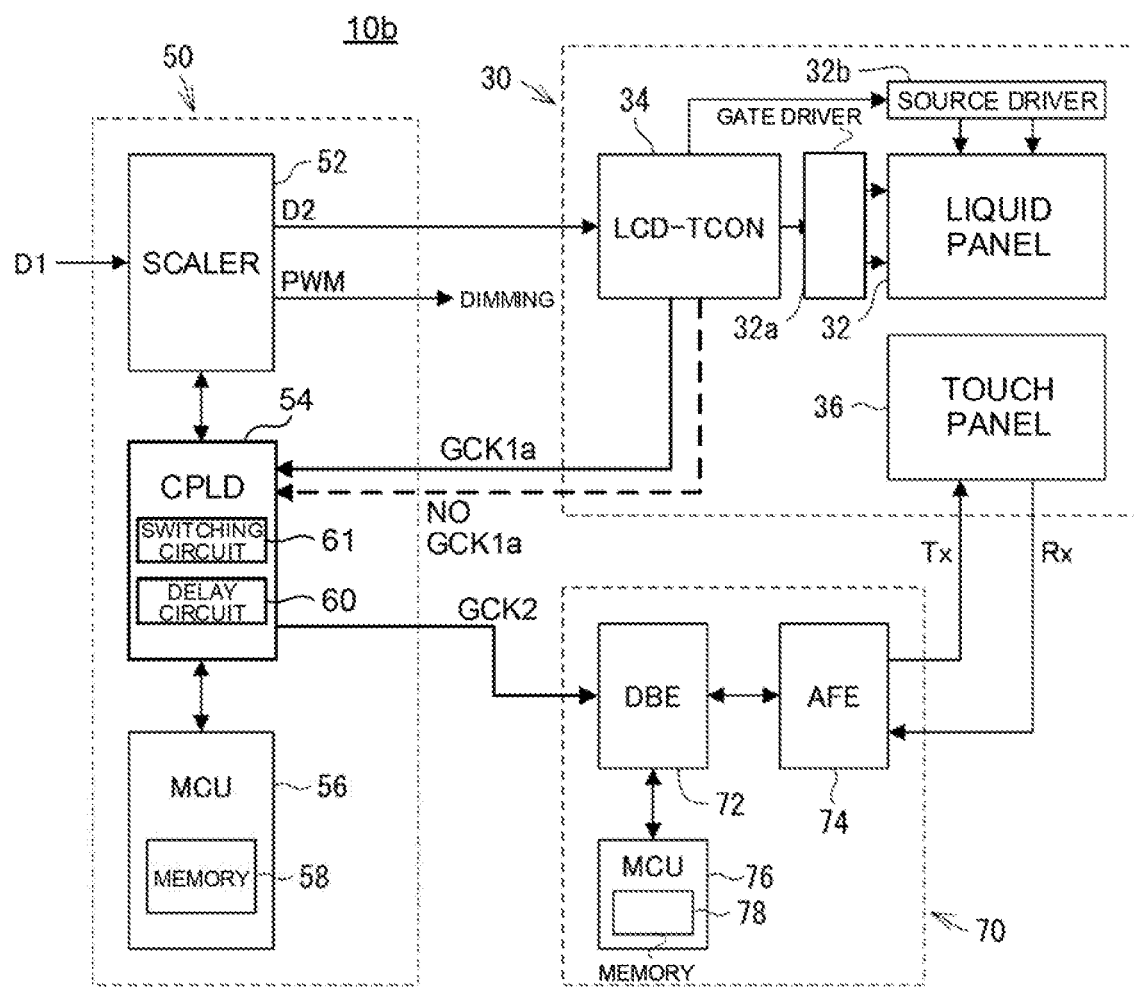
FIG. 8 is a block diagram illustrating a schematic configuration of an electrical part of a touch panel display according to a second embodiment of the present disclosure.

FIG. 8 is a block diagram illustrating a schematic configuration of an electrical part of the touch panel display 10b according to the second embodiment. In the touch panel display 10b, the CPLD 54 includes a switching circuit 61. The other configuration is the same as that of the touch panel display 10a according to the first embodiment illustrated in FIG. 3.

In the touch panel display 10b, the CPLD 54 monitors the input of the gate clock signal GCK 1a. When the gate clock signal GCK 1a is input (the display period), the CPLD 54 adds the delay amount Ld to the gate clock signal GCK 1a to generate the gate clock signal GCK 2. On the other hand, when the gate clock signal GCK 1a is not input at a predetermined period (the non-display period), the CPLD 54 adds the delay amount Ld to the gate clock signal GCK 1b generated based on the period of the gate clock signal GCK 1a to generate the gate clock signal GCK 2.

For example, the CPLD 54 measures the drive frequency in advance, when the gate clock signal GCK 1a is not input (the non-display period), the CPLD 54 generates a pulse signal having the driving frequency (the gate clock signal GCK 1b). That is, the CPLD 54 generates the gate clock signal GCK 1a in a pseudo manner. Then, the CPLD 54 adds the delay amount Ld to the generated gate clock signal GCK 1b to generate the gate clock signal GCK 2. The CPLD 54 inputs the generated gate clock signal GCK 2 to the DBE 72 in the touch panel control board 70.

The switching circuit 61 in the CPLD 54 inputs the gate clock signal GCK 1a to the delay circuit 60 during the display period, and inputs the gate clock signal GCK 1b to the delay circuit 60 during the non-display period. That is, among the gate clock signal GCK 1a and gate clock signal GCK 1b which are input to the switching circuit 61; the switching circuit 61 performs an operation of switching to output the gate clock signal GCK 1a in the display period and to output the gate clock signal GCK 1b in the non-display period. The delay circuit 60 in the CPLD 54 outputs the gate clock signal GCK 2 obtained by adding the predetermined delay amount Ld to the gate clock signal GCK 1a or the gate clock signal GCK 1b, which are input from the switching circuit 61, to the touch panel control board 70.

Figure 9:
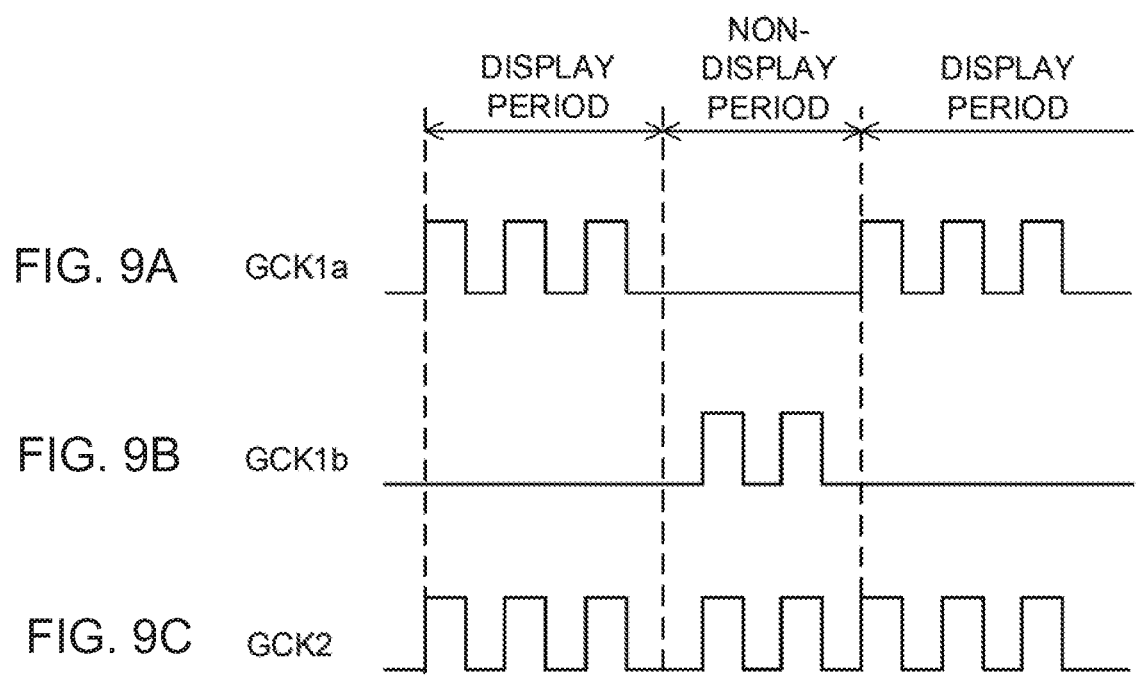
FIGS. 9A to 9C are waveform diagrams schematically illustrating examples of a gate clock signal in the second embodiment of the present disclosure.

FIG. 9A illustrates the gate clock signal GCK 1a output from the liquid crystal timing controller 34 during the display period. FIG. 9B illustrates the gate clock signal GCK 1b generated in the CPLD 54 during the non-display period. FIG. 9C illustrates the gate clock signal GCK 2 generated based on the gate clock signals GCK 1a and GCK 1b. Although the delay amount Ld is added to the gate clock signal GCK 2, the illustration is omitted for convenience.

When the DBE 72 obtains the gate clock signal GCK 2 in the display period and the non-display period, the DBE 72 generates the drive signal Tx based on the gate clock signal GCK 2 in cooperation with the AFE 74, and inputs the drive signal Tx to the touch panel 36. In this way, the touch panel 36 is operated in the display period and the non-display period. That is, in the non-display period when the liquid crystal panel 32 is not operating, it is possible to avoid that the operation of the touch panel 36 becomes invalid. Therefore, even if no video signal is input, it is possible to return from the standby state to the normal state by a touch operation on the touch panel 36 by the user.

Figure 10:
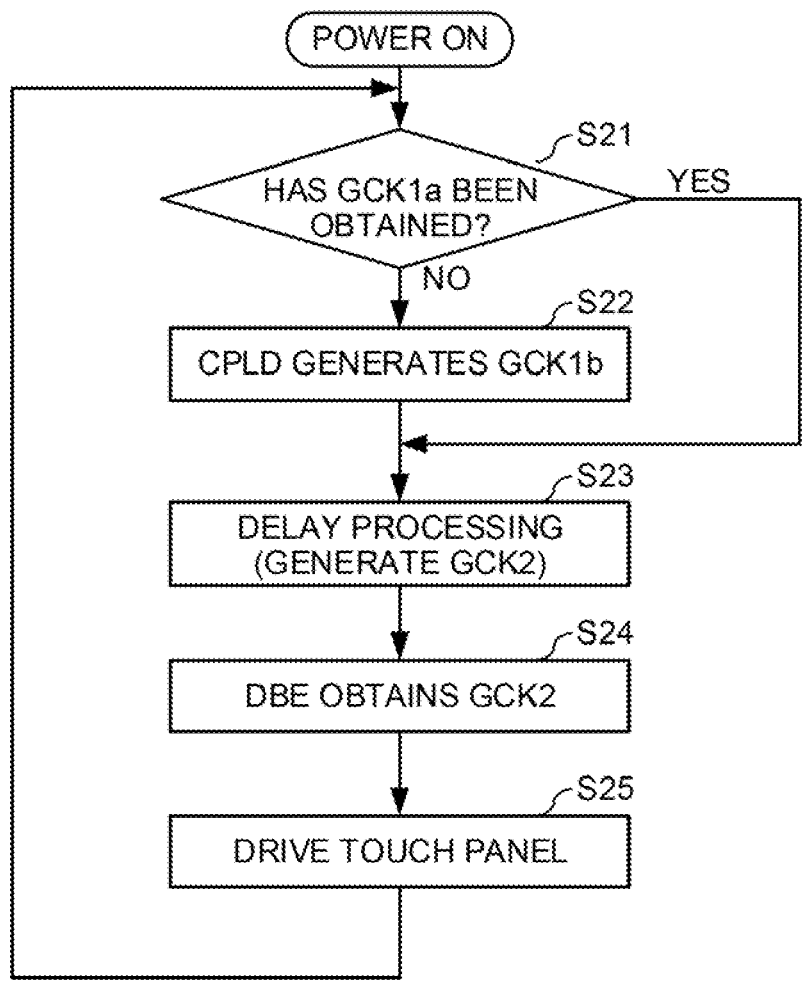
FIG. 10 is a flow diagram illustrating a flow of the overall operation of the touch panel display according to the second embodiment of the present disclosure.

FIG. 10 illustrates an overall processing flow of the touch panel display 10b according to the second embodiment.

As illustrated in FIG. 10, when the touch panel display 10b is turned on and activated, in step S21, the CPLD 54 monitors the input of the gate clock signal GCK 1a output from the liquid crystal timing controller 34. When the CPLD 54 obtains the gate clock signal GCK 1a, the process proceeds to step S23. When the CPLD 54 does not acquire the gate clock signal GCK 1a at a predetermined period, the process proceeds to step S22.

For example, in the display period in which the video signal D1 is input to the scaler 52, the gate clock signal GCK 1a is output from the liquid crystal timing controller 34. Therefore, the CPLD 54 obtains the gate clock signal GCK 1a. On the other hand, in the non-display period when no video signal D1 is input to the scaler 52, the gate clock signal GCK 1a is not output from the liquid crystal timing controller 34. Therefore, the CPLD 54 cannot acquire the gate clock signal GCK 1a.

Here, the CPLD 54 measures in advance the period of the gate clock signal GCK 1a acquired during the display period. Then, the CPLD 54 determines that the CPLD 54 does not acquire the gate clock signal GCK 1a, when the gate clock signal GCK 1a is not input from the liquid crystal timing controller 34 at the timing according to the period.

When the CPLD 54 cannot acquire the gate clock signal GCK 1a in the predetermined period (S21: NO), that is, in the non-display period, the CPLD 54 generates the gate clock signal GCK 1b in step S22. Specifically; the CPLD 54 measures the period of the gate clock signal GCK 1a (the drive frequency) in advance and generates a pulse signal having the same period as the gate clock signal GCK 1b.

When the CPLD 54 obtains the gate clock signal OCR 1a (S21: YES) or when the CPLD 54 generates the gate clock signal GCK 1b (S22), the CPLD 54 generates the gate clock signal GCK 2 in step S23. Specifically, the CPLD 54 (the delay circuit 60) adds the delay amount Ld preset by the MCU 56 to the gate clock signal GCK 1a or the gate clock signal GCK 1b, thereby generating the gate clock signal GCK 2. That is, in the display period, the CPLD 54 adds the delay amount Ld to the gate clock signal GCK 1a to generate the gate clock signal GCK 2. On the other hand, in the non-display period, the CPLD 54 adds the delay amount Ld to the gate clock signal GCK 1b to generate the gate clock signal GCK 2. Note that the MCU 56 executes processing for setting the appropriate delay amount Ld in the delay circuit 60 in accordance with the delay amount setting program described above. The CPLD 54 inputs the generated gate clock signal GCK 2 to the DBE 72 in the touch panel control board 70.

Next, in step S24, the DBE 72 in the touch panel control board 70 obtains the gate clock signal GCK 2 from the CPLD 54.

Next, in step S25, the touch panel control board 70 starts driving the touch panel 36, that is, starts inputting the drive signal Tx to the touch panel 36 based on the gate clock signal GCK 2. Further, the touch panel control board 70 starts accepting input of the position signal Rx from the touch panel 36 based on the gate clock signal GCK 2. As a result, the entire touch panel display 10b including the touch panel 36 is activated. Thereafter, the processing returns to step S21, and the above-described processing is repeated. Note that the series of processes is terminated by turning off the power of the touch panel display 10b.

As described above, the CPLD 54 generates a correction synchronization signal (the gate clock signal GCK 1b) based on the gate clock signal GCK 1 acquired from the liquid crystal timing controller 34 during the display period, outputs the correction synchronization signal to the touch panel control board 70 during the non-display period.

The touch panel display 10b drives the touch panel 36 based on the gate clock signal GCK 1a output from the liquid crystal timing controller 34 in the display period. The touch panel display 10b generates the correction synchronization signal (the gate clock signal GCK 1b) having the same period as the gate clock signal GCK 1a, and drives the touch panel 36 based on the gate clock signal GCK 1b in the non-display period. Therefore, in the non-display period, invalidation of the operation of the touch panel 36 can be avoided, so that it is possible to return from the standby state to the normal state by a touch operation by the user.

According to the second embodiment, the malfunction caused by the gate drive noise N can be avoided, the number of scans can be increased. Therefore, the accuracy of detecting the position of the touch panel 36 can be improved. Further, since the invalidation of the operation of the touch panel 36 in the non-display period can be avoided, it is possible to restore the standby state to the normal state by the touch operation by the user.

Note that the gate clock signal GCK 1a is an example of the first gate clock signal according to the present disclosure, and the gate clock signal GCK 1b is an example of a third gate clock signal according to the present disclosure.

The touch panel display 10b according to the second embodiment is not limited to the configuration described above. For example, when the gate clock signal GCK 1a is not input, the touch panel display 10b may generate the gate clock signal GCK 1b with the following configuration (modified example). Each of the modifications illustrated below is a configuration for dynamically generating the gate clock signal GCK 1b every time it is detected that the gate clock signal GCK 1a is not input.

First Modification Example

The touch panel display 10b according to the first modification example monitors and stores the gate clock signal GCK 1a. When the gate clock signal GCK hi is not input (the non-display period), the touch panel display 10b generates a signal waveform (pulse signal) having the same period as the period (the drive frequency) of the stored gate clock signal GCK 1*a*. Specifically, as illustrated in FIGS. 11A to 11C, the CPLD 54 samples (polls) the gate clock signal GCK 1*a* input during the display period, and measures (counts) the interval from the rising edge to the next rising edge, to acquire the period of the gate clock signal GCK hi, and generate a pulse signal having the same period as the period, as the gate clock signal GCK 1*b* (correction synchronization signal). The CPLD 54 also stores the duty ratio of the high-level and low-level of the gate clock signal GCK 1*a* to generate the gate clock signal GCK 1*b*. For example, the CPLD 54 samples the gate clock signal GCK 1*a* in about ten periods, and generates the gate clock signal GCK 1*b* using the period of the average value.

Second Modification Example

The touch panel display 10*b* uses the gate driving timing as the rewriting timing with respect to the synchronization signal. There are a back porch period and a front porch period as the time when the liquid crystal panel 32 is not driven. When using such timings, the touch panel display 10*b* monitors the plurality of signals to generate the gate clock signal GCK 1*b*. The vertical synchronization signal VS (FIG. 12A) operates at 16 ms (sixteen millisecond), and a dummy drive period is provided before and after the vertical synchronization signal VS. Note that the gate clock signal GCK 1*a* (FIG. 12B) of the gate drive waveform is a dummy and is not actually driven. The touch panel display 10*b* performs interpolation of a plurality of signals (generation of the gate clock signal GCK 1*b*) even when a plurality of signals is used.

Third Modification Example

As a method for detecting that the gate clock signal GCK 1*a* is not input, that is, a method for detecting the non-display period, the following method can be applied. For example, the CPLD 54 detects that the rising edge of the pulse signal (the gate clock signal GCK 1*a*) does not occur in the period (timing) measured in advance, and detects the non-display period. For example, in the sampling (polling) to the gate clock signal GCK 1*a* illustrated in FIGS. 11A to 11C, when the CPLD 54 cannot detect the rising edge at the timing when the rising edge should be detected, the CPLD 54 detects that the display is turned off without the gate clock signal GCK 1*a* being input, that is, the non-display period. In the process of detecting that the rising does not occur, there is a possibility of erroneous detection if detecting once. Therefore, the CPLD 54 may be configured to determine that the gate clock signal GCK 1*a* is not input when detecting a plurality of times (for example, three times).

Fourth Modification Example

The touch panel display 10*b* may measure the period of each synchronization signal when the touch panel display 10*b* is activated, and may generate the gate clock signal GCK 1*b* when the rising edge of the gate clock signal GCK 1*a* corresponding to the measured period is not detected. In this manner, by storing the period measured when the touch panel display 10*b* is activated, it is not necessary to remeasure the period of each synchronization signal to generate the gate clock signal GCK 1*b*. Since the system cannot be recombined while the touch panel display 10*b* is powered up, the processing may be performed only once at the time of startup.

Figure 13:
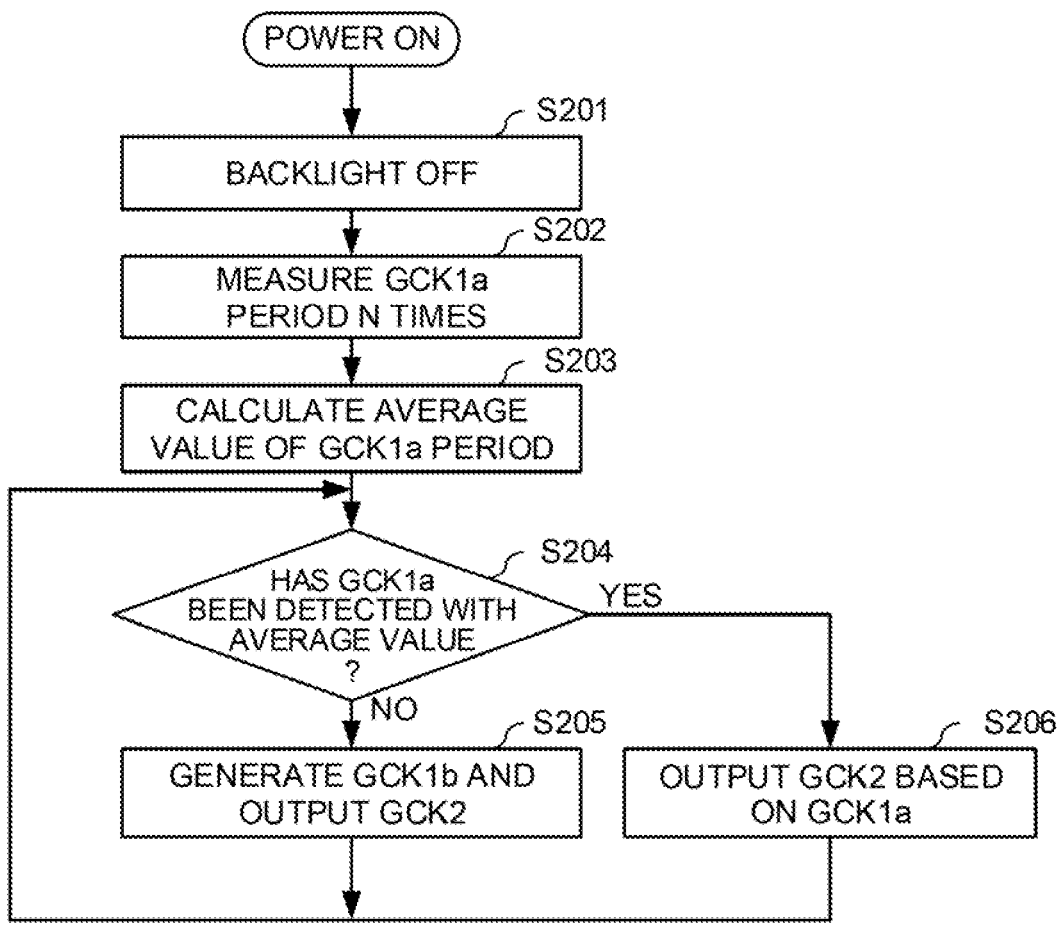
FIG. 13 is a flow diagram illustrating a flow of operations in a modification example of the touch panel display according to the second embodiment of the present disclosure.

The flow of the operation of the touch panel display 10*b* corresponding to the above modification examples will be described below. Here, the setting process of the delay amount Ld is omitted. FIG. 13 is a flow chart illustrating an operation flow in the modification examples of the touch panel display 10*b*.

As illustrated in FIG. 13, after the touch panel display 10*b* is powered on, in step S201, the scaler 52 turns off the backlight (displays black) by the PWM signal.

Next, in step S202, the CPLD 54 monitors the gate clock signal GCK 1*a* and measures the period of the gate clock signal GCK 1*a* n times. More specifically, the number of measurements n is set to ten or less. The CPLD 54 performs one measurement at 7.5 us (microsecond).

Next, in step S203, the CPLD 54 calculates the average value (average period) of the periods acquired by n measurements.

Next, in step S204, the CPLD 54 samples the gate clock signal GCK 1*a*, and determines whether the rising edge of the pulse signal has been detected. Here, the CPLD 54 determines whether the rising edge has been detected three times. When not detected (S204: NO), the process proceeds to step S205, and when detected (S204: YES), the process proceeds to step S206.

In step S205, the CPLD 54 generates the correction synchronization signal (the gate clock signal GCK having the same period as the average period, and outputs it as the gate clock signal GCK 2. The DBE 72 in the touch panel control board 70 obtains the gate clock signal GCK 2 (the gate clock signal GCK 1*b*) from the CPLD 54. Thereafter, the process returns to step S204.

In step S206, the CPLD 54 outputs the gate clock signal GCK 1*a* as the gate clock signal GCK 2. The DBE 72 in the touch panel control board 70 obtains the gate clock signal GCK 2 (the gate clock signal GCK 1*a*) output from the CPLD 54. Thereafter, the process returns to step S204.

It should be noted that when the delay amount Ld is set, the CPLD 54 outputs the gate clock signal GCK 2 to which the delay amount Ld is added. The touch panel control board 70 starts driving the touch panel 36, that is, starts inputting the drive signal Tx to the touch panel 36, based on the gate clock signal GCK 2 acquired from the CPLD 54. Further, the touch panel control board 70 starts accepting input of the position signal Rx from the touch panel 36, based on the gate clock signal GCK 2 acquired from the CPLD 54. As a result, the entire touch panel display 10*b* including the touch panel 36 is activated. Therefore, it is possible to avoid the invalidation of the operation of the touch panel 36 in the non-display period.

The above-described processing is executed every time the touch panel display 10*b* is activated. Thereby, it is possible to dynamically execute the interpolation processing of the gate clock signal in the non-display period.

The present disclosure is suitable for the aforementioned electronic blackboard. That is, in the electronic blackboard, the locus of the touch position on the touch panel 36 by the user is displayed on the screen of the liquid crystal panel 32. In the electronic blackboard, for example, if the influence of the gate drive noise N is not avoided, due to the influence of the gate drive noise N, unintentional patterns such as points and lines that are completely unrelated to the touch operation by the user are displayed on the screen of the liquid crystal panel 32. The present disclosure is extremely suitable for avoiding such inconvenience.

The present disclosure can also be applied to a configuration in which an organic electro-luminescence (EL) display of an active matrix driving type, for example, is adopted instead of the liquid crystal module 30. That is, the present disclosure can be applied to a configuration in which a display apparatus of an active matrix driving type is employed. The present disclosure can also be applied to a display apparatus other than the active matrix drive type, such as a display apparatus of a simple matrix drive type, or extremely a display apparatus of a cathode ray tube (CRT) type.

The scope of the present disclosure is not limited to the scope set forth herein, but is indicated by the scope of the appended claims. In this case, all of the meanings and ranges equivalent to those of the claims are included.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A touch panel control apparatus for controlling a touch panel which is provided to overlap with a display panel and outputs a position signal corresponding to a touch position by a user, the touch panel control apparatus comprising
a delay setting portion which sets a delay amount corresponding to a first gate clock signal to control a driving timing of a gate line provided in the display panel;
a signal generator which adds the delay amount set by the delay setting portion to the first gate clock signal to generate a second gate clock signal; and
a touch panel driver which drives the touch panel based on the second gate clock signal generated by the signal generator,
wherein the delay setting portion measures a period from a rising timing of the first gate clock signal to immediately before a timing at which noise appearing on the position signal by driving the gate line occurs, and sets the delay amount based on the period measured.

2. The touch panel control apparatus according to claim 1, wherein the signal generator obtains the first gate clock signal from a timing controller which controls to drive the display panel.

3. The touch panel control apparatus according to claim 1, wherein the touch panel driver does not drive the touch panel during a period from a rising timing of the second gate clock signal to a timing at which an occurrence period of the noise ends.

4. The touch panel control apparatus according to claim 1, wherein the delay setting portion individually sets the delay amount for each touch panel.

5. The touch panel control apparatus according to claim 1, wherein the delay setting portion sets the delay amount based on the noise appearing by turning on a power source of the touch panel to display a predetermined pattern image.

6. The touch panel control apparatus according to claim 1, wherein the signal generator generates a third gate clock signal including the same period as the first gate clock signal when the first gate clock signal cannot be acquired, and adds the delay amount set by the delay setting portion to the third gate clock signal to generate the second gate clock signal.

7. The touch panel control apparatus according to claim 6, wherein the signal generator generates the third gate clock signal in a non-display period in which an image is not displayed on the display panel.

8. The touch panel control apparatus according to claim 6, wherein the signal generator adds the delay amount set by the delay setting portion to the first gate clock signal in a display period in which an image is displayed on the display panel to generate the second gate clock signal, and
wherein the signal generator adds the delay amount set, by the delay setting portion to the third gate clock signal in a non-display period in which no image is displayed on the display panel to generate the second gate clock signal.

9. The touch panel control apparatus according to claim 1, wherein the touch panel is a capacitive type touch panel.

10. The touch panel control apparatus according to claim 1, wherein the touch panel is provided on the display panel by direct bonding.

11. A method of controlling a touch panel which is provided to overlap a display panel and which outputs a position signal corresponding to a touched position by a user, the method comprising
setting a delay amount corresponding to a first gate clock signal to control a driving timing of a gate line provided in the display panel;
adding the delay amount set to the first gate clock signal to generate a second gate clock signal; and
driving the touch panel based on the second gate clock signal,
wherein, in the setting a delay amount, a period from a rising timing of the first gate clock signal to immediately before a timing at which noise appearing on the position signal occurs by driving the gate line is measured, and the delay amount is set based on the period measured.

12. An input display apparatus, comprising
a display apparatus which displays an image on a display panel;
a touch panel which is provided to overlap with the display apparatus and outputs a position signal corresponding to a touch position by a user; and
a touch panel control apparatus according to claim 1.

* * * * *